US011140584B2

(12) United States Patent
Hinc et al.

(10) Patent No.: US 11,140,584 B2
(45) Date of Patent: Oct. 5, 2021

(54) INTER-FREQUENCY HANDOVER

(71) Applicant: T-Mobile USA, Inc., Bellevue, WA (US)

(72) Inventors: Mehmet Hinc, Bellevue, WA (US); Waqas Gull, Bellevue, WA (US); Taha Najeeb, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 206 days.

(21) Appl. No.: 16/385,620

(22) Filed: Apr. 16, 2019

(65) Prior Publication Data

US 2020/0037211 A1 Jan. 30, 2020

Related U.S. Application Data

(60) Provisional application No. 62/702,953, filed on Jul. 25, 2018, provisional application No. 62/815,591, filed on Mar. 8, 2019.

(51) Int. Cl.
*H04W 36/00* (2009.01)

(52) U.S. Cl.
CPC ................ *H04W 36/0058* (2018.08)

(58) Field of Classification Search
CPC ................................. H04W 36/0058
See application file for complete search history.

(56) References Cited

U.S. PATENT DOCUMENTS

| 2015/0304853 | A1* | 10/2015 | Murray | ................ | H04W 16/14 455/454 |
| 2016/0381600 | A1 | 12/2016 | Aksu | | |
| 2018/0295522 | A1* | 10/2018 | Wong | .................... | H04W 16/14 |
| 2019/0132776 | A1* | 5/2019 | Markwart | ............. | H04W 36/16 |

(Continued)

FOREIGN PATENT DOCUMENTS

| KR | 101838842 | | 3/2018 |
| KR | 101858381 | B1 | 5/2018 |
| WO | WO2017186294 | A1 | 11/2017 |

OTHER PUBLICATIONS

The PCT Search Report and Written Opinion dated Oct. 24, 2019 for PCT Application No. PCT/US2019/041037, 12 pages.

(Continued)

*Primary Examiner* — Ricky Q Ngo
*Assistant Examiner* — Stephen N Steiner
(74) *Attorney, Agent, or Firm* — Lee & Hayes, P.C.

(57) ABSTRACT

A node of a radio access network (e.g., a cellular network) can receive a revocation message revoking a spectrum grant (e.g., a Citizens Broadband Radio Service, CBRS, discontinuation notice). The node can determine a first group of terminals that are in communication with the node via wireless resources within the spectrum grant. The node can, in response to the revocation message, trigger respective inter-band handovers of the terminals of the first group of terminals. In some examples, a system includes a domain proxy that receives a grant message indicating the spectrum grant; notifies the node; subsequently, receives a revocation message revoking the spectrum grant; and sends a handover command to the node in response to the revocation message. The spectrum grant can be located within 3GPP band forty-eight or other bands.

20 Claims, 7 Drawing Sheets

(56) References Cited

U.S. PATENT DOCUMENTS

2019/0364565 A1* 11/2019 Hmimy ................ H04W 16/14

OTHER PUBLICATIONS

"Acronyms and Definitions Pertaining to Commercial Operations in the U.S. 3500-3700 MHz BAnd", FCC Definitions, 2018, retrieved Jul. 6, 2018 from <<https://www.wirelessinnovation.org/fcc-definitions>>, 6 pages.

"Citizens Broadband Radio Service", Wikipedia, Apr. 18, 2018, retrieved Jul. 6, 2018 from <<https?//en.wikipedia.org/w/index.php?title=Citizens_Broadband_Radio_Service&oldid=837106714>>, 3 pages.

Shetty, M. "3G/UMTS Inter-frequency, Intra-frequency and Inter-RAT handover events", Jan. 16, 2014, retrieved Jul. 6, 2018 from <<https://www.kmshetty.com/2014/01/3gumts-inter-frequency-intra-frquency.html>>, 2 pages.

"Sierra Wireless and Ruckus Networks Showcase Live CBRS Private Network Demonstration at Mobile World Congress 2018", BusinessWire, Feb. 26, 2018, 4 pages.

"Signaling Protocols and Procedures for Citizens Broadband Radio Service (CBRS): Spectrum Access System (SAS)-Broadband Radio Service Device (CBSD) Interface Technical Specification", Innovation Forum, Jan. 3, 2018, Document WINNF-TS-0016, Version V1.2.1, pp. 1-33.

Sok, Sitha, "UMTS Handover control", Dec. 2014, retrieved Jul. 6, 2018 from <<https://telecom-knowledge.blogspot.com/2014/12/umts-handover-control.html, pp. 1-8, 13-19, 22-25, and 31-32.

* cited by examiner

US 11,140,584 B2

INTER-FREQUENCY HANDOVER

CROSS-REFERENCE TO RELATED APPLICATIONS

This application is a nonprovisional application of, and claims priority to and the benefit of, U.S. Patent Application Ser. No. 62/815,591, filed Mar. 8, 2019, entitled "Inter-Frequency Handover," and U.S. Patent Application Ser. No. 62/702,953, filed Jul. 25, 2018, entitled "Forced Inter-Frequency Handover," the entirety of each of which is incorporated herein by reference.

BACKGROUND

Modern telecommunications networks such as cellular telephone networks can support a variety of types of session, such as voice, video, or messaging. Second-generation (2G) and third-generation (3G) cellular networks such as Global System for Mobile Communications (GSM) networks or Universal Mobile Telecommunications System (UMTS) networks generally carry streaming media over circuit-switched (CS) connections. Fourth-generation (4G) cellular networks such as Long Term Evolution (LTE) networks and fifth-generation (5G) cellular networks such as the Third-Generation Partnership Project (3GPP) 5G System generally carry streaming media over packet-switched (PS) connections. Such packet-switched connections can provide greater speed and throughput than do CS connections, and can make packet-switched data from other networks, such as the Internet, more readily available. However, many networks include wireless access networks spanning multiple technology generations due to the substantial infrastructure investment needed to expand cellular networks. For example, recent deployments of LTE or 5G networks may operate on both Citizens Broadband Radio Service (CBRS) bands and licensed bands in a particular area.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be, in at least one example, included in the first component or operation.

DETAILED DESCRIPTION

Overview

Figure 1:
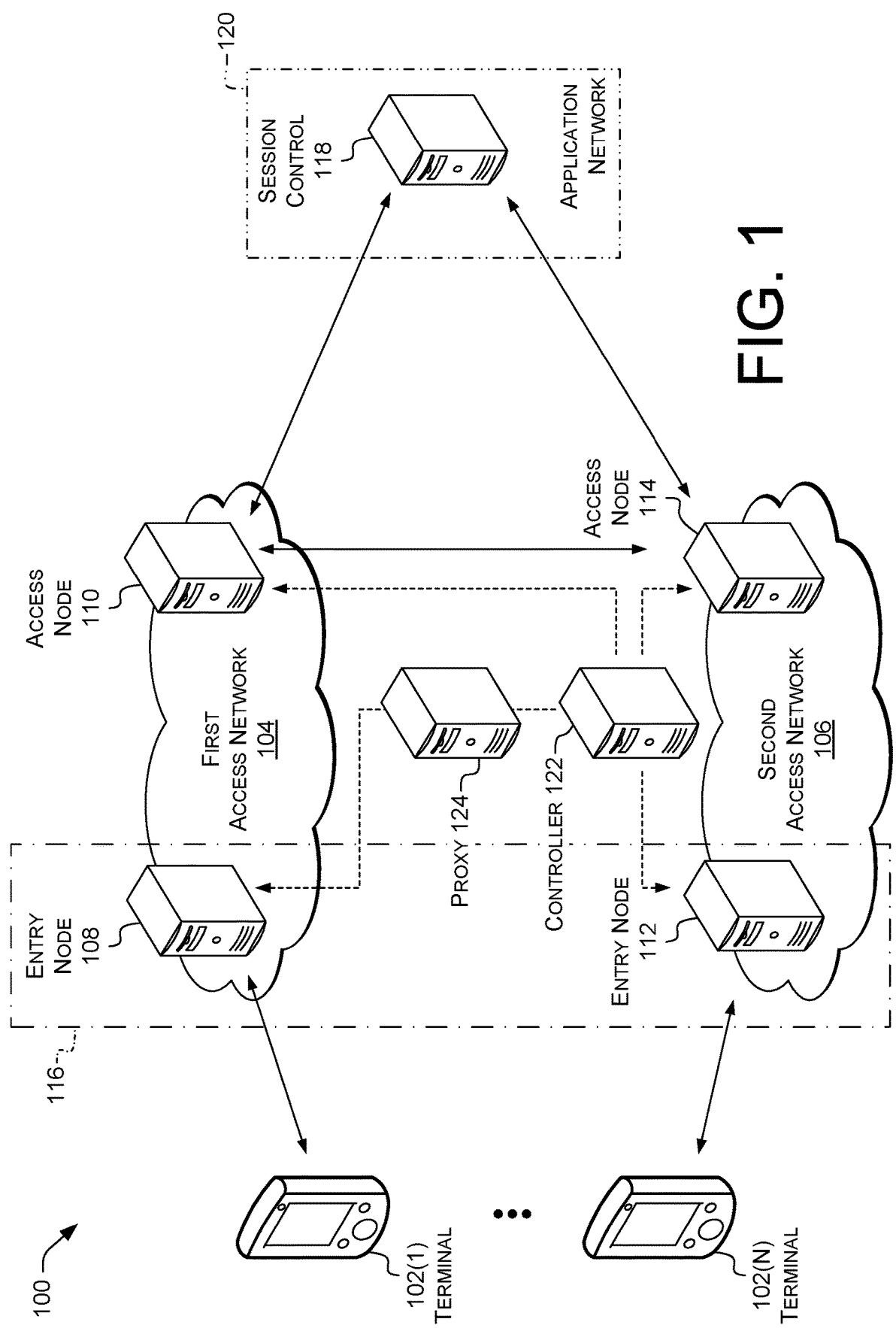
FIG. 1 illustrates an overview of nodes and devices involved in control of attachment or handover of terminals.

This disclosure describes, in part, a telecommunications network configured to implement attach or handover control of a terminal. In some examples, a first access network (e.g., LTE or 5G (e.g., New Radio, NR) in a CBRS band) can cause a terminal to move to a second, different access network (e.g., LTE or 5G in a licensed band) in response to dynamic revocation of a spectrum grant in the first access network. CBRS bands provide spectrum grants to unlicensed users, but those users must discontinue use within 60 s of a notification that the grant is being revoked. Various examples permit cellular networks to comply with this and similar restrictions without dropping calls or other communication sessions as a result of the loss of a spectrum grant.

As used herein, a "terminal" is a communication device, e.g., a cellular telephone or other user equipment (UE), configured to perform, or intercommunicate with systems configured to perform, techniques described herein. Terminals can include, e.g., wireless or wired voice- or data-communication devices. A terminal can include a user interface (e.g., as does a smartphone), but is not required to. For example, a streaming server configured to provide audio or visual content on demand can be a terminal. Such a terminal may not include a user interface, and may instead respond to other terminals that form queries and send those queries to the server in response to actions taken via interfaces at those other terminals. A terminal can be, e.g., a cellular phone, smartphone, tablet computer, personal digital assistant (PDA), personal computer (PC), laptop computer, media center, work station, etc.

The terms "session" and "communication session" as used herein includes a communications path for bidirectional exchange of data among two or more terminals. Example sessions include voice and video calls, e.g., by which human beings converse, a data communication session, e.g., between two electronic systems or between an electronic system and a human being, or a Rich Communication Suite (RCS, also known as JOYN) session. Sessions can be carried, e.g., by cellular or data networks, e.g., LTE or Institute of Electrical and Electronics Engineers (IEEE) 802.11 (WIFI). Other examples of networks are discussed below.

Subsection headers in this Detailed Description are solely for convenience in reading. No limitations are implied by the presence or arrangement of the subsection headers, or by the separation of features between those subsections. Some examples include features from only one subsection. Some examples include features from more than one subsection.

Various examples herein are not limited to the specific usage scenarios with respect to which they are discussed. Some examples herein relate to time-division duplexing (TDD). The described techniques can additionally or alternatively be used with frequency-division duplexing (FDD) or other LTE or 5G technologies. Similarly, some examples refer to 3GPP Band 48 (B48) for clarity of explanation, but this is not limiting. The described technology can additionally or alternatively be used in other bands, e.g., Band 66 (B66).

As used herein, the term "unique identifier" and similar terms encompass both truly unique identifiers (e.g., Ethernet MAC addresses that are unique by construction, or Version 1 UUIDs) and identifiers with a negligible probability of collision (non-uniqueness) (e.g., SHA256 hashes of data uniquely identifying an object, or Version 4 UUIDs).

As used herein, a "random" value can be a truly random value, e.g., measured from physical phenomena, or a pseudorandom value. Examples of random values include cryptographically-strong random numbers.

Illustrative Telecommunications Network and Components

FIG. 1 illustrates an example telecommunications network 100 and shows an overview of nodes and devices involved in control of attachment or handover of terminals. The illustrated nodes represent network functions that can be implemented as standalone device(s), or combined with other network functions into a single device or collection of device(s). The telecommunications network 100 includes terminals 102(1)-102(N) (individually or collectively referred to herein with reference 102), N≥1. A terminal 102 may be or include a cellular phone or other type of terminal such as those described above. Terminal 102 can be configured to originate or receive communications sessions.

In some examples, terminal 102 can communicate, e.g., via a first access network 104 or a second access network 106. Terminal 102 may participate in a handover between first access network 104 and second access network 106, e.g., as a user moves in and out of coverage areas of individual access networks 104 or 106, or in response to revocation of a spectrum grant. A single-connectivity (or single-radio, SR) terminal 102 can communicate via one access network 104, 106 at a time. A dual-connectivity (dual-radio, DR) terminal 102 can communicate concurrently via both access network 104 and access network 106. Some examples herein relate to SR terminals 102.

In the illustrated example, first access network 104 includes a first entry node 108, e.g., a 5G gNodeB, and a first access node 110, e.g., a 5G Access and Mobility Management Function (AMF). Second access network 106 includes a second entry node 112, e.g., an LTE eNodeB, and a second access node 114, e.g., an LTE mobility management entity (MME). Other examples of access nodes include a GSM mobile switching center (MSC) server (MSS). Terminal 102 can communicate via the respective entry nodes 108, 112 with the respective access nodes 110, 114. For brevity herein, the term "entry node" refers to a gNodeB, eNodeB, Radio Network Controller (RNC), WIFI access point (AP), or other network device that is the initial node that terminal 102 communicates with in order to access the services of a corresponding access network 104, 106.

In other examples, access networks 104, 106 include respective LTE networks operating on different bands, or respective 5G networks operating on different bands. For example, access network 104 can be an LTE network operated by a small cell and running in unlicensed spectrum (e.g., B48), and access network 106 can be an LTE network operated by a macrocell and running in licensed spectrum (e.g., B2). In some examples, represented by node 116, entry nodes 108 and 112 can be combined in a single eNodeB or gNodeB that supports multiple bands. In some examples using node 116, one of the access nodes 110, 114 can be omitted. For example, a single LTE MME can be used regardless of which band terminal 102 is attached to.

The terminal 102 can be configured to initiate or receive a communication session, such as a voice call, a video call, or another sort of synchronous communication. Initiation of such communications may involve communication clients and Session Initiation Protocol (SIP, RFC 3261) clients communicatively connected with components of the telecommunications network, e.g., session-control node 118. In various embodiments, the session-control node 118 represents components of an Internet Protocol (IP) Multimedia Subsystem (IMS) core network. Session-control node 118 can be part of an application network 120, e.g., an IMS network or other network providing services to terminal 102. Application network 120 can also be referred to as an "upper-level" network that uses the services provided by access networks 104, 106 to communicate with terminals 102. Network 100 can include or be connected with any number of access networks 104, 106 or any number of application networks 120.

In some examples, access nodes 110, 114 or entry nodes 108, 112 can communicate with a controller 122 to receive spectrum grants usable for communications with terminals 102. For example, entry node 108 (or node 116) can be or include a CBRS Service Device (CBSD) that makes use of CBRS spectrum. Controller 122 can be or include a Spectrum Access System (SAS), e.g., by FEDERATED WIRELESS or COMMSCOPE, that grants and revokes spectrum in a CBRS block to CBSDs, on request of the CBSDs or in response to bandwidth needs of priority (Priority Access License, PAL) or legacy (e.g., U.S. Government, radar, or fixed satellite) users. CBRS spectrum grants therefore vary over time in ways not controlled by the CBSDs (e.g., entry node 108). Although shown as separate from access networks 104 and 106 and from application network 120, controller 122 can be part of any of those, or can communicate with ones of those of which it is or is not part, in various examples. In some examples, CBRS operates in the 150 MHz from 3550 MHz-3700 MHz, e.g., LTE TDD B48. In some examples, CBRS operates in two 80 MHz-wide bands in the 3.5 GHz region, e.g., LTE TDD B42 and B43.

Spectrum users (e.g., small cells) deployed in the CBRS spectrum block must discontinue operation within 60 seconds of an instruction to do so (a "discontinuation notice") from a SAS, e.g., controller 122. LTE terminals camped on CBRS bands (e.g., attached to access networks operating in CBRS bands) must hand over to other bands in order to avoid call drops. However, prior schemes do not provide a way for terminals to hand over. Instead, those prior schemes simply discontinue operation, resulting in dropped calls. In some examples herein, an entry node 108, 112, or 116, e.g., an eNodeB or other network node functioning as a CBSD, triggers interband handovers on all attached terminals within the 60-second window. This permits sessions to continue across the handover on the new band. Various aspects therefore reduce the occurrence of dropped sessions in combined CBRS/licensed cellular networks, or in other multiband networks. A technical effect is to trigger handover of a terminal in response to discontinuation of a spectrum allocation.

Some alternatives include dropping all terminals in response to a message from the SAS revoking spectrum access. Other alternatives include notifying all terminals in response to such a message, waiting a predetermined period of time, then dropping all terminals. Handing over terminals, as described herein, can provide improved session continuity compared to these alternatives.

A handover between access networks can include, for example, a handover from a B48 LTE first access network 104 to a B66 LTE second access network 106. Terminal 102 can be handed over from B42, B43, or B48 to B66, e.g., in response to cancellation of a B48 spectrum grant. However, handover is not limited to these examples. For example, a handover can include a handover from a packet-switched first access network 104 to a circuit-switched second access network 106. Additionally or alternatively, an SR terminal 102 can be handed over from a 5G access network to an LTE access network, or in general between a first access network of a first type and a second access network, e.g., of the first type or of a second, different type (e.g., PS to CS or vice versa).

Discontinuation notices can be received by the CBSD directly from a SAS, or via a proxy 124, e.g., a domain proxy. In some examples, controller 122 represents a domain proxy, and the SAS is omitted for brevity. In some examples, controller 122 represents a SAS and proxy 124 represents a domain proxy. In the illustrated example, controller 122 is connected to multiple entry nodes 108, 112, and the connection runs via proxy 124 for one of those entry nodes 108, 112. In other examples (omitted for brevity), controller 122 is connected to one or more proxies 124, and each proxy 124 is connected to one or more entry nodes 108, 112.

Figure 3:
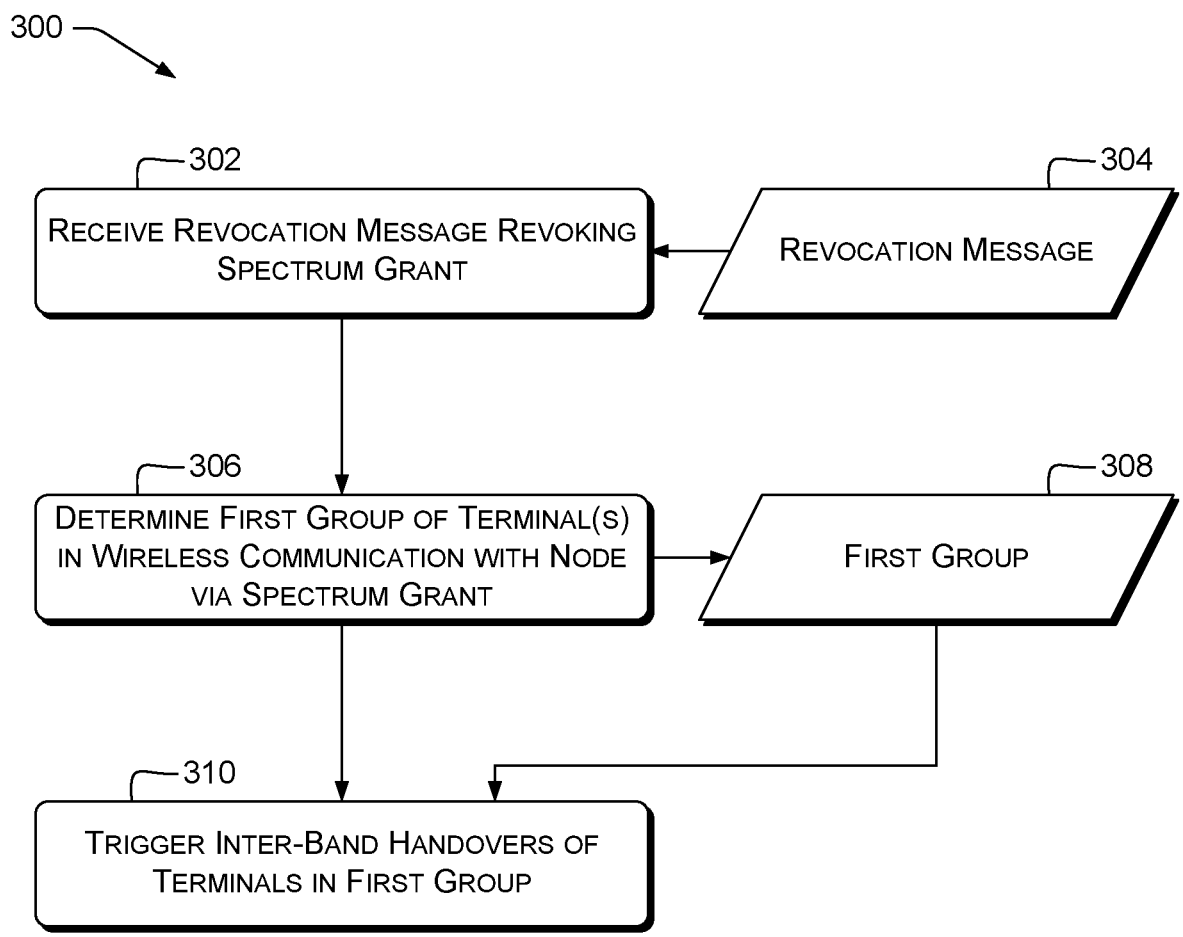
FIG. 3 illustrates an example handover-triggering process performed in a telecommunications network, e.g., at an entry node thereof.

In some examples, the entry node 108, 112, or 116 acts as or is connected with a CBSD, determines when and how to hand over terminals, and implements the handovers (e.g., FIG. 3). In other examples, the domain proxy determines when and how to hand over terminals (e.g., FIG. 6), and the entry node 108, 112, or 116 implements the handovers (e.g., FIG. 7).

In some examples, handover is performed using inter-frequency or inter-RAT handover techniques described in the LTE or 5G Radio Resource Control (RRC) specifications, e.g., 36.133 or 36.331. In some examples, communications between the SAS (controller 122) and the domain proxy (proxy 124), between the SAS (controller 122) and the CBSD (e.g., entry node 108, 112, or 116, such as an eNodeB or gNodeB), or between the domain proxy (proxy 124) and the CBSD (e.g., entry node 108, 112, or 116, such as an eNodeB or gNodeB) are carried out as specified in WINNF-TS-0016 ("TS16") by the WIRELESS INNOVATION FORUM (references herein t ov1.2.1 of 2018 Jan. 3), e.g., using HTTPS to transport JSON payloads.

In some examples, an entry node 108, 112, or 116 (e.g., a CBSD/eNB/gNB) is a small-cell device using a CBRS band as the primary coverage band. Terminals 102 can preferentially camp on CBRS bands in some of these examples. This can reduce co-channel interference that might otherwise exist between macrocells and small cells in licensed bands (e.g., B2). Moreover, in the U.S., the CBRS spectrum is relatively unoccupied away from coastal areas, so using CBRS bands can increase overall network capacity.

Each of the first access node 110, the second access node 114, and the session-control node 118, may each be or include a server or server farm, multiple, distributed server farms, a mainframe, a work station, a PC, a laptop computer, a tablet computer, an embedded system, or any other sort of device or devices. In one implementation, one or more of first access node 110, the second access node 114, and the session-control node 118 may represent a plurality of computing devices working in communication, such as a cloud-computing node cluster. Also, the first access node 110, the second access node 114, and the session-control node 118 may each be or include nodes or devices of a telecommunications network. Examples of such components are described below with reference to FIG. 2.

As noted above, SIP can be used to establish and manage communication sessions. SIP is an IP-based protocol, so terminal 102 exchanges SIP messages via an IP link with session-control node 118. To establish IP connectivity via a 5G access network 104, terminal 102 sends a Service Request message to access network 104, e.g., to a gNodeB of a 5G access network. The gNodeB communicates with the AMF to obtain an IP address for terminal 102. The gNodeB can also obtain other information, e.g., the IP address of a session-control node 118. Session-control node 118 can include, e.g., a P-CSCF via which terminal 102 can access IMS services. The gNodeB responds to terminal 102 with the requested information. Terminal 102 is then able to communicate via IP with session-control node 118 or other IP-connected nodes or devices.

Session-control services are generally provided by session-control node 118 independently of the type of access network(s) used for any particular communication session. This permits providing consistent session-control services between, e.g., PS and CS terminals, or throughout a communication session when one party leaves a PS coverage area and hands over to a CS access network. Similarly, access-network selection, a component of attach or handover control, is generally performed with respect to the radio characteristics of each available access network 104, 106, without regard to the types of sessions for which the communication link will be used.

In some examples, the first access network 104 or the second access network 106 may be any sort of access network, such as a GSM or UMTS network; a universal terrestrial radio network (UTRAN) or an Enhanced Data rates for GSM Evolution (EDGE) radio access network (GERAN); an evolved universal terrestrial radio access network (E-UTRAN); a 3GPP 5G access network; a WIFI (IEEE 802.11) or other LAN access network; or a satellite or terrestrial wide-area access network such as a wireless microwave access (WIMAX) network. In some examples, the first access network 104 or the second access network 106 may include a base station (an eNodeB or gNodeB), as well as an RNC. In some examples, the first access network 104 or the second access network 106 may use any sort of air interface, such as a code division multiple access (CDMA), time division multiple access (TDMA), or frequency division multiple access (FDMA) air interface. In some examples, the first access network 104 may provided packet-switched connections and the second access network 106 may provide circuit-switched connections. In some examples, the first access network 104 may be a packet-switched cellular type of access network and the second access network 106 may be a packet-switched local-area-network type of access network. Examples of LAN access networks can include WIFI and IEEE 802.15.1 (BLUETOOTH). In some examples, access networks 104, 106 may include any network configured to transport IP packets, e.g., IPv4, IPv6, or any other evolution of an IP-based technology.

In some examples, a non-cellular network can carry voice traffic using Voice-Over-IP (VoIP) or other technologies as well as data traffic, or a cellular network can carry data packets using High Speed Packet Access (HSPA), LTE, or other technologies, as well as voice traffic. Some cellular networks carry both data and voice in a PS format. For example, many LTE networks carry voice traffic in data packets according to the voice-over-LTE (VoLTE) standard.

Telecommunications networks, such as network 100 or a component thereof, may include a core network operated by one or more service providers ("carriers"), such as one or more cellular-telephony providers. The core network is connected via access networks to terminals. Terminals can be operated by users ("subscribers"), or can be autonomous. Example access networks carrying traffic of sessions can include 2G, 3G, or 4G cellular networks; wired data networks such as Ethernet, Asynchronous Transfer Mode (ATM), Public Switched Telephone Network (PSTN), Data Over Cable Service Interface Specification (DOCSIS), digital subscriber line (DSL), or optical networks (e.g., Synchronous Optical NETwork, SONET); or wireless data networks such as IEEE 802.11 WIFI, 802.15.1 BLUETOOTH, or 802.16 WIMAX networks carrying VoIP (e.g., VoWIFI) calls. Some examples can include or be interoperable with LTE or 3GPP fifth-generation New Radio (5G NR) cellular networks carrying VoLTE sessions using SIP signaling. In some examples, the network 100 can provide wide-area wireless coverage using a technology such as GSM or other 2G cellular technologies; UMTS or other 3G cellular technologies; or LTE or other 4G cellular technologies. Example cellular-network technologies can include CDMA, TDMA, Evolution Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), EDGE, Advanced Mobile Phone System (AMPS), HSPA, evolved HSPA (HSPA+), GERAN, UTRAN, or evolved UMTS Terrestrial RAN (E-UTRAN).

In some examples, the telecommunications network 100 can include or be communicatively connected with an interworking function (IWF) or other node or device configured to bridge networks, e.g., LTE, 3G, and POTS networks. In some examples, the IWF can bridge Signaling System 7 (SS7) traffic from the PSTN into the telecommunications network 100, e.g., permitting PSTN customers to originate sessions with cellular customers and vice versa.

As used herein, a message "sent to," "transmitted to," or "transmitted toward" a destination, or similar terms, can be sent directly to the destination, or can be sent via one or more intermediate network nodes or devices to the destination. Those intermediate network nodes or devices can include access nodes 110, 114. Similarly, a message "received from" a destination can be received directly from the destination, or can be received via one or more intermediate network nodes or devices from the destination. A message passing through one or more intermediate network nodes or devices can be modified by those network nodes or devices, e.g., by adding or removing framing, or by changing a presentation of at least part of the message, e.g., from a SIP start-line to a SIP header or vice versa. As used herein, a "reply" message is synonymous with a "response" message. The term "reply" is used for clarity, e.g., when discussing reply messages sent in response to the receipt of messages. The phrase "communicatively connected" includes any type of connection, wired or wireless, for communicating data between devices or processors. These devices or processors can be located in physical proximity or not.

The illustrated nodes, or at least some of them, can be computing nodes in a cluster computing system, e.g., a cloud service or other cluster system ("computing cluster" or "cluster") having several discrete computing nodes that work together to accomplish a computing task assigned to the cluster as a whole. In some examples, at least one illustrated component can be a client of a cluster and can submit jobs to the cluster and/or receive job results from the cluster. Nodes in the cluster can, e.g., share resources, balance load, increase performance, and/or provide fail-over support and/or redundancy. Additionally or alternatively, at least illustrated component can communicate with the cluster, e.g., with a load-balancing or job-coordination device of the cluster, and the cluster or components thereof can route transmissions to individual nodes.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

Figure 2:
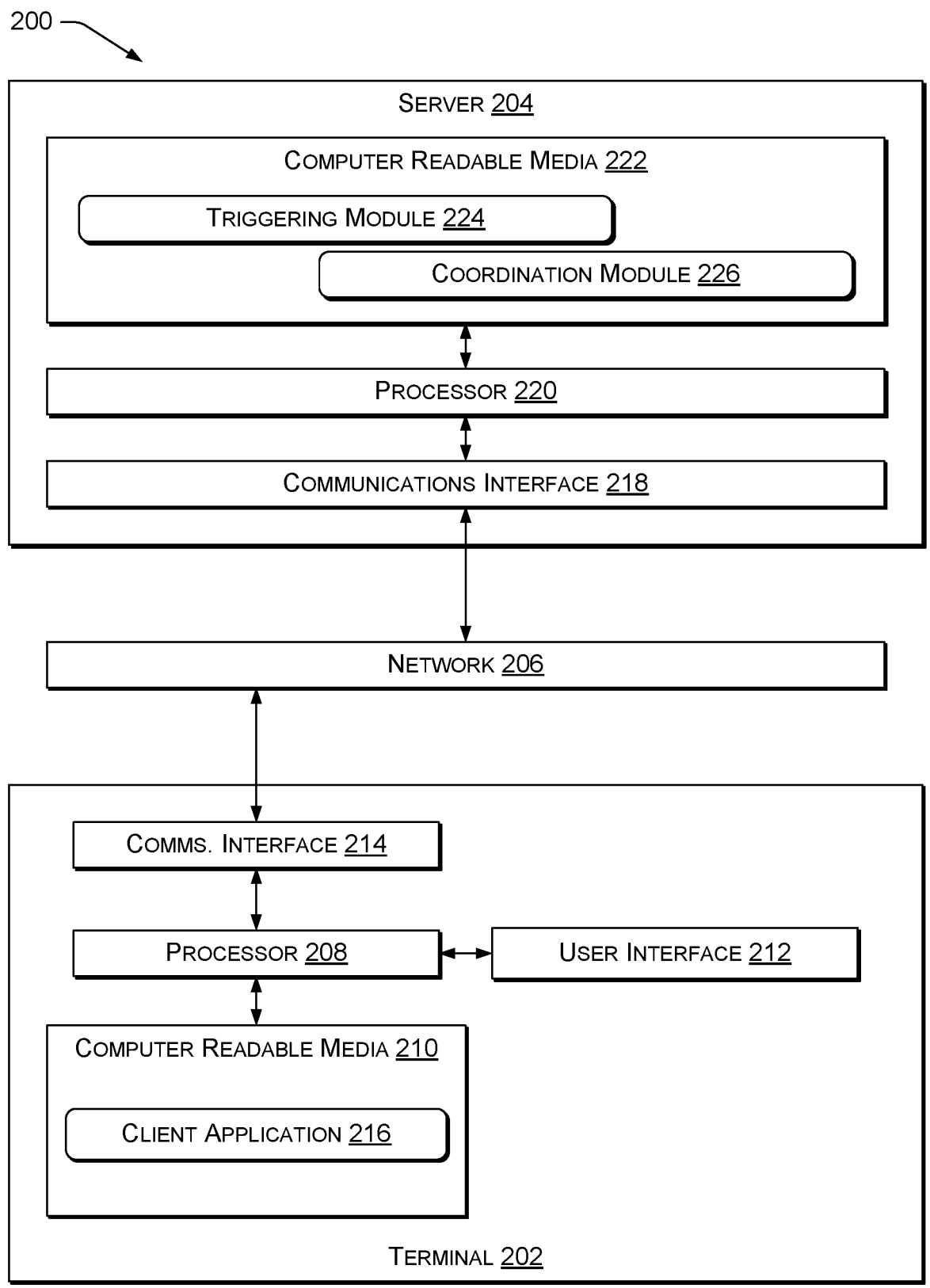
FIG. 2 is a block diagram illustrating components of a system that provides attach or handover control according to some implementations.

FIG. 2 is a block diagram illustrating a system 200 permitting handover or attach control according to some implementations. The system 200 includes a terminal 202 (which can represent terminal 102) communicatively connectable with a server 204 via a network 206. The server 204 can represent an access node 110 or 114, a session-control node 118, a controller 122, or another control system of a telecommunications network configured to perform functions described herein. Server 204 can be implemented using dedicated or shared (e.g., cloud) computing hardware. The network 206 can include one or more networks, such as a cellular network, e.g., 5G, or a non-cellular network, e.g., WIFI. Example network technologies are described above with reference to FIG. 1. In some examples, a SAS, Domain Proxy, CBSD, base stations, access point, or terminal can include one or more components shown in FIG. 2, and can connect to one or more wired or wireless networks.

The terminal 202 can include one or more processors 208, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). Terminal 202 can include one or more computer readable media (CRM) 210, such as semiconductor memory (e.g., RAM, read-only memory (ROM), solid state drives (SSDs), or the like), disk drives (e.g., platter-based hard drives), another class of computer-readable media, or any combination thereof. The terminal 202 can further include a user interface (UI) 212, e.g., including an electronic display device, a speaker, a vibration unit, a touchscreen, or other devices for presenting information to a user and receiving commands from the user. The terminal 202 can further include one or more communications interface(s) 214, e.g., radio(s) or other network interface(s), configured to selectively communicate (wired or wirelessly) via the network 206, e.g., via an access network 104 or 106.

CRM 210 can be used to store data and to store instructions that are executable by the processors 208 to perform various functions as described herein. CRM 210 can store various classes of instructions and data, such as an operating system, device drivers, program modules, etc. The processor-executable instructions can be executed by the processors 208 to perform the various functions described herein. CRM 210 can be or include computer-readable storage media. Computer-readable storage media include, but are not limited to, registers, floppy disks, hard disks, SSDs, bar codes, Compact Discs (e.g., CD-ROM), digital versatile disks (DVDs), other optical storage, ROM, erasable programmable read-only memories (EPROM, EEPROM, or Flash), random-access memories (RAMs), other semiconductor memory technology, magnetic cassettes, magnetic tape, magnetic disk storage or other magnetic storage devices, or any other tangible, non-transitory medium which can be used to store the desired information and which can be accessed by the processors 208. In some examples, CRM 210 can include a non-volatile memory in a Subscriber Identity Module (SIM) card.

CRM 210 can include processor-executable instructions of a client application 216. In some examples, terminal 202 can be configured to, e.g., by executing the processor-executable instructions, initiate or receive sessions, attach to networks, or handover between networks, e.g., as defined in LTE, 5G, and IMS specifications. The client application 216, e.g., a native or other dialer, can permit a user to originate and receive communication sessions, e.g., voice or Unstructured Supplementary Service Data (USSD), associated with the terminal 202. The client application 216 can additionally or alternatively include an SMS, RCS, or presence client, or a client of another telephony service offered by the server 204.

In some examples, server 204 can communicate with (e.g., is communicatively connectable with) terminal 202 or other nodes or devices via network 206 using one or more communications interface(s) 218, e.g., network transceivers for wired or wireless networks, or memory interfaces. Example communications interface(s) 218 can include Ethernet or FIBRE CHANNEL transceivers, WIFI radios, or DDR memory-bus controllers (e.g., for DMA transfers to a network card installed in a physical server 204). Communications interface(s) 214 can include any of the components described in this paragraph.

The server 204 can include one or more processors 220 and one or more CRM 222. CRM 222 can be used to store processor-executable instructions of a triggering module 224 or a coordination module 226. The triggering module 224 can trigger handovers, e.g., as discussed herein with reference to FIG. 3, 4, or 7. The coordination module 226 can function as or be used by a domain proxy 124 connecting controller(s) 122 with entry node(s) 108, 112, or 116, e.g., as discussed herein with reference to FIG. 5 or 6. The processor-executable instructions of modules 224 and 226 can be executed by the one or more processors 220 to perform various functions described herein. In some examples, server 204 can be configured to, e.g., by executing the processor-executable instructions, perform functions described herein with reference to FIGS. 3-7, e.g., receiving CBRS messages, determining which terminals 102 to handover and in which order, and sending messages to cause those terminals 102 to handover.

In some examples, server 204 also includes or is communicatively connected with a UI 212 or similar subsystem. For example, server 204 can transmit Web pages and related data rendered by a browser on terminal 202 or another computing device, and can receive responses from those Web pages.

In some examples, processor 208 and, if required, CRM 210, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include processor 220 with, if required, CRM 222.

Illustrative Messages and Operations

FIG. 3 is a dataflow diagram illustrating an example process 300 for triggering handovers, and related data items. Process 300 can be performed, e.g., by entry nodes 108, 116 or other servers 204 of a telecommunications network 100. In some examples, first wireless access network 104 is B48 LTE or 5G and second wireless access network 106 is B66 LTE or 5G. Each of nodes 108, 110, 112, and 114 can be or include a server 204 or process(es) or module(s) running thereon, or other type(s) of control unit(s) to perform the listed functions. In some examples, server(s) 204 include control unit(s) configured to perform operations described below, e.g., in response to computer program instructions of the triggering module 224.

Operations shown in FIG. 3 and in FIGS. 4-7, discussed below, can be performed in any order except when otherwise specified, or when data from an earlier step is used in a later step. For clarity of explanation, reference is herein made to various components shown in FIGS. 1 and 2 that can carry out or participate in the steps of the exemplary methods, and to various operations and messages that can occur while the exemplary method is carried out or as part of the exemplary method. It should be noted, however, that other components can be used; that is, exemplary method(s) shown in FIGS. 3-7 are not limited to being carried out by the identified components, and are not limited to including the identified operations or messages.

At 302, the control unit can receive a revocation message 304 revoking a spectrum grant. The control unit can receive revocation message 304 via a communications interface 218, in some examples. Revocation message 304 can be, e.g., a TS16 Heartbeat Response indicating failure of a Heartbeat Request or termination of a grant, or a Grant Response message indicating failure of a Grant Request (TS16 § 7, § 8.6, and FIG. 3). The spectrum grant can relate to, e.g., a frequency range, a transmission timeslice, a power level, or other aspects of spectrum usage. For example, the spectrum grant can indicate a range of spectrum in the 3.5 GHz band that is available for cellular communications for the duration of the grant. In some examples, the spectrum grant is located within 3GPP B48. The revocation message 304 can indicate that the grant has terminated. The revocation message 304 can include, e.g., an indication of a particular spectrum grant being revoked, or of a range of frequencies or timeslices in which all spectrum grants are being revoked. In some examples, the revocation message 304 can include a CBRS discontinuation notice.

At 306, the control unit can determine a first group 308 of terminals 102 that are in communication with the node via wireless resources within the spectrum grant. For brevity, throughout this discussion, a "group" can include one member or more than one member, e.g., fewer than all of those terminals 102 or all of those terminals 102. For example, the control unit can retrieve identification information of one or more terminals 102 that together constitute the first group 308. The identification information can be retrieved from a CRM 222 or other storage, or can be taken from the results of a database query. In some examples, the first group 308 comprises or consists of every terminal 102 in communication with the node via wireless resources within the spectrum grant. The terminals 102 can be selected for inclusion in the first group 308 based at least in part on at least one of the criteria described herein with reference to operation 410.

At 310, the control unit can, in response to the revocation message 304, trigger respective inter-band handovers of the terminals 102 of the first group 308 of terminals 102. In some examples, operation 310 can include triggering the inter-band handovers within a predetermined time period associated with the revocation message 304 (e.g., 60 s for CBRS). In some examples, an entry node 108, 112, or 116 (e.g., a CBSD/eNB/gNB) supports multiple bands, e.g., B48 (a CBRS band), B66, and unlicensed bands (e.g., using Licensed Assisted Access, LAA)). In some of these examples, the control unit hands over CBRS-connected terminals 102 to a predetermined one of those bands, e.g., B66.

In some examples, the control unit (e.g., of a CBSD such as entry node 108) can trigger a handover at a terminal 102 in the first group 308 by transmitting to that terminal 102 an RRC message. The RRC message can include, e.g., an RRC SystemInformationBlockType1 message including a multi-BandInfoList IE indicating one or more bands. The one or more bands can exclude the spectrum grant, e.g., the CBRS band from which the terminal 102 is being removed. Additionally or alternatively, the control unit can trigger a handover by transmitting an RRCConnectionReconfiguration or RRCConnectionRelease message.

Figure 4:
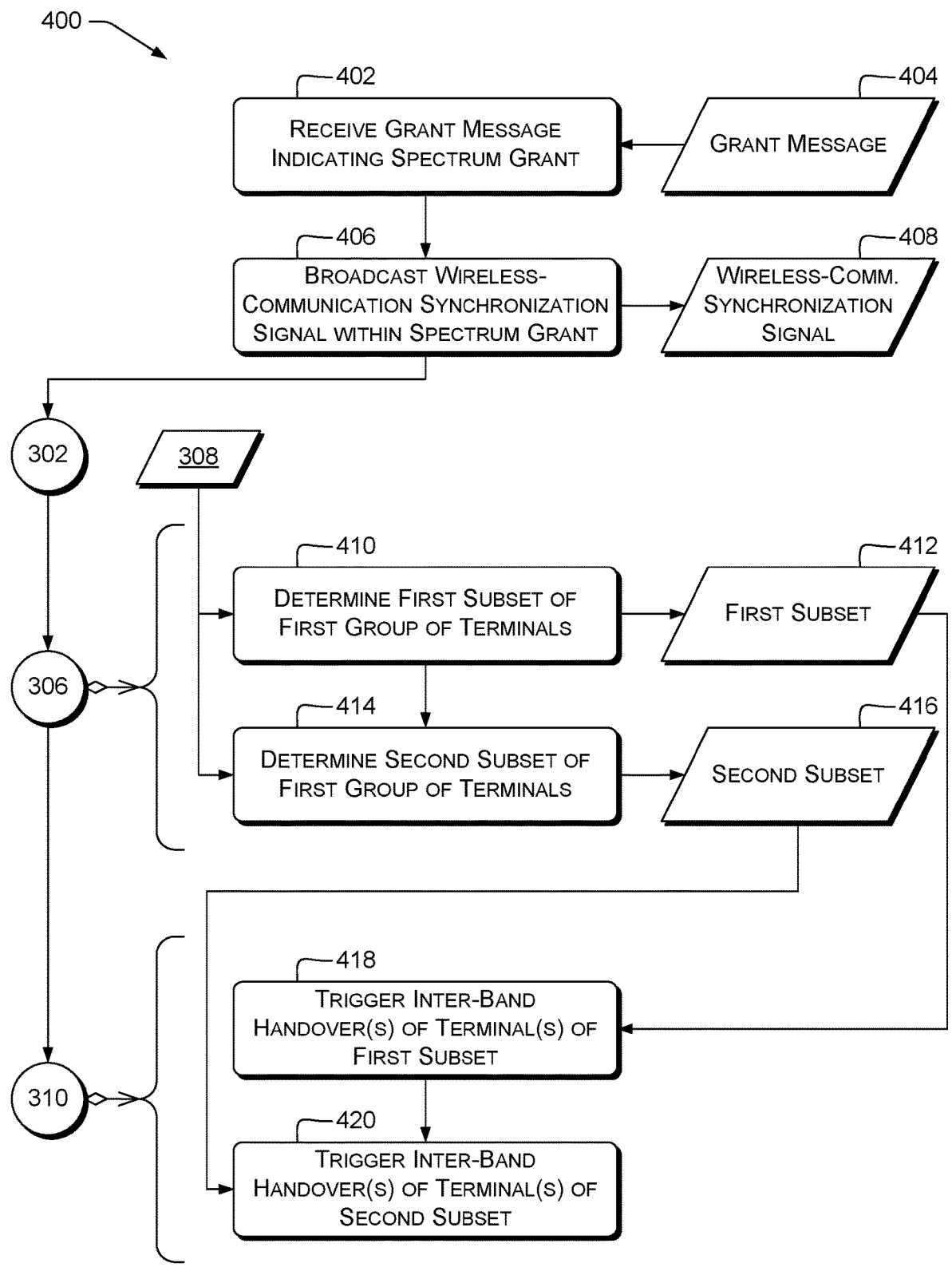
FIG. 4 illustrates example communications and handover-triggering processes performed in a telecommunications network, e.g., at an entry node thereof.

FIG. 4 illustrates example processes 400 performed by server(s) 204 of a telecommunications network 100 for triggering handovers. In some examples, server(s) 204 include control unit(s) configured to perform operations described below, e.g., in response to computer program instructions of the triggering module 224. In some examples, operations 402 and 406 can precede operation 302. Operation 306 can include operations 410 and 414 (which can be performed in that order, or in any relative order, in various examples). Operation 310 can include operations 418 and 420.

At 402, the control unit can receive a grant message 404 indicating the spectrum grant. For example, grant message 404 can be a Grant Response or successful Heartbeat Response message as defined in TS16 (§ 8.5 or § 8.6).

At 406, the control unit can broadcast a wireless-communication synchronization signal 408 within the spectrum grant, i.e., within spectrum indicated in the grant message 404. For example, an LTE entry node 108, 112, 116 can broadcast an LTE Primary Synchronization Channel (PSCH) signal or an LTE Secondary Synchronization Channel (SSCH) on a frequency or frequencies within the spectrum grant. This can permit the terminal(s) 102 to discover and receive wireless service from the control unit.

At 410, the control unit can determine a first subset 412 (e.g., a proper subset) of the first group 308 of terminals 102. Terminals 102 in the first subset can be terminals 102 that are participating in active emergency sessions. In some examples, the first subset comprises or consists of every terminal 102 of the first group 308 that is participating in an active emergency session. Examples herein describing first and second subsets are not limiting; any number≥2 of subsets can be determined and sequentially handed over.

For example, the control unit can track the RRC establishment causes given in RRCConnectionRequest messages associated with the terminals 102 (or the RRC re-establishment causes given in RRCConnectionReestablishmentRequest messages associated with the terminals 102). The control unit can include in the first subset 412 a terminal 102 for which an active RRC connection has an establishment cause of "emergency."

Additionally or alternatively, the control unit can query an IMS or other application network 120 to determine whether a particular terminal 102 is participating in an active emergency session. For example, the control unit can send an IMSI, IMEI, TMSI, or other identifier of a terminal 102 to an IMS emergency call session control function (E-CSCF). The E-CSCF can respond with an indication of whether or not that terminal 102 is participating in an active emergency session. If the indication is positive, the control unit can add that terminal 102 to first subset 412.

Additionally or alternatively, the control unit can track higher-level (e.g., IMS) state, or query application network 120 for higher-level state. The control unit can determine that a particular terminal 102 is participating in an active emergency session if that terminal has sent a SIP INVITE to an emergency number or URL (e.g., tel: 911) but has not yet sent a SIP BYE command, or has not yet received a SIP 2xx response to a BYE.

Whether or not a terminal 102 is participating in an emergency session is one example of a criterion that can be used in determining a group 308 of terminals 102, or a subset 412 of terminals 102. In some examples, a terminal 102 can be selected for inclusion in group 308 or subset 412 (e.g., terminal 102 can be assigned to the first subset 412) based at least in part on one or more predetermined criteria (e.g., one or more stored predetermined criteria) associated with at least one of: signal strength or quality of a signal from an entry node 108, 112, or 116 received at that terminals 102; signal strength or quality of a signal from that terminal 102 received at the entry node 108, 112, or 116; wireless-network capacity at the entry node 108, 112, or 116 (e.g., an entry node 108, 112, or 116 that is a candidate for receiving that terminal 102 via inter-band handover) or at other servers 204; or types of session(s) in which that terminal 102 is currently participating. For example, terminals 102 can be selected for inclusion in group 308 or subset 412 according to one or more predetermined criteria stored in a computer-readable medium. Criteria can be determined empirically for specific network conditions.

Criteria can include, e.g., that a value of any of the types listed above be greater than, less than, greater in magnitude than, less in magnitude than, or equal to, a predetermined value, or contained within one or more predetermined range(s) or subset(s). Examples include a signal strength greater than a threshold or within a range or a session type within a predetermined set of session types.

In some examples, terminals 102 providing (or receiving) relatively higher-strength signals can be included in a group 308 or subset 412, terminals 102 providing (or receiving) relatively lower-strength signals can be excluded, or vice versa. In another example, if some terminals 102 are participating in active voice (e.g., VoLTE) or media (e.g., live streaming, whether uplink or downlink) sessions, those terminals 102 can be included and terminals 102 not participating in such sessions excluded. Therefore, for example, terminals 102 participating in certain types of sessions can be handed over before terminals 102 not participating in those sessions.

In some examples, multiple criteria can be applied, e.g., in a predetermined priority order. For example, a group 308 or subset 412 can be expanded (e.g., filled to a predetermined or dynamically-available capacity) first with (a) terminals 102 participating in emergency sessions, then (capacity permitting) with (b) terminals 102 participating in VoLTE or other real-time media sessions, then (capacity permitting) with (c) terminals 102 participating in low-latency sessions, then (capacity permitting) with (d) terminals 102 participating in other types of sessions, then (capacity permitting) with (e) terminals 102 that do not have any active sessions. A session can be categorized as "low-latency" or other than "low-latency" based at least in part on, e.g., that session's QCI, 5QI, QFI, NSSAI, or other indication of the QoS or network resources assigned to a session. For example, sessions with QCI 3, 65, 69, 75, or 79 can be considered "low-latency," and sessions with other QCIs considered not to be "low-latency" sessions. In some examples, any QCI corresponding with a packet delay budget less than a predetermined threshold (e.g., 100 ms) is considered to mark a "low-latency" session.

In some examples, if a terminal 102 is participating in multiple sessions, that terminal's priority in the assignment of groups 308 or subsets 412 can be determined to be the highest priority associated with any active session of that terminal 102. For example, a terminal participating in both a VoLTE session and a non-low-latency file-transfer session (e.g., QCI 6) can be considered to be participating in a VoLTE session (category (b) above) for purposes of determining a group 308 or subset 412. In some examples, any of the above categories (a)-(e) can be omitted or combined with any other category, or different categor(ies) can be used. In some examples, any combination of any of the categories or criteria listed above can be used in assigning terminals 102 to groups 308 or subsets 412.

At 414, the control unit can determine a second subset 416 of the first group 308 of terminals 102. Terminals 102 in the second subset 416 can be terminals 102 that are not participating in active emergency sessions. This can be done as described herein with reference to operation 410, only adding terminals 102 to the second subset 416 if they do not have an active RRC connection with an establishment cause of "emergency," or if the indication from the E-CSCF is negative. Additionally or alternatively, second subset 416 can be determined using any of the criteria described above with reference to first subset 412. In some examples, each terminal 102 in the second subset 416 is not in the first subset 412, i.e., no terminal 102 is in both first subset 412 and second subset 416.

At 418, the control unit can trigger the respective interband handovers of the terminals 102 of the first subset 412, e.g., of at least one terminal 102 of the first subset 412 or of all terminals 102 of the first subset 412. Examples are discussed herein, e.g., with reference to operation 310.

At 420, the control unit can trigger the respective interband handovers of the terminals 102 of the second subset 416. Examples are discussed herein, e.g., with reference to operation 310. In some examples, operation 418 can be performed with respect to at least one terminal 102 before operation 420 is performed. Additionally or alternatively, operation 418 can be performed in its entirety (handovers triggered for each and every terminal of the first subset 412) before operation 420 is performed.

Accordingly, in some of these examples in which operation 418 at least partly precedes operation 420, at least some terminals 102 participating in emergency sessions are handed over (e.g., from CBRS to licensed or other spectrum) before terminals 102 not participating in emergency sessions are handed over. This reduces the probability that an emergency call will be dropped due to overload of a licensed or other band receiving the handed-over terminals 102.

Figure 5:
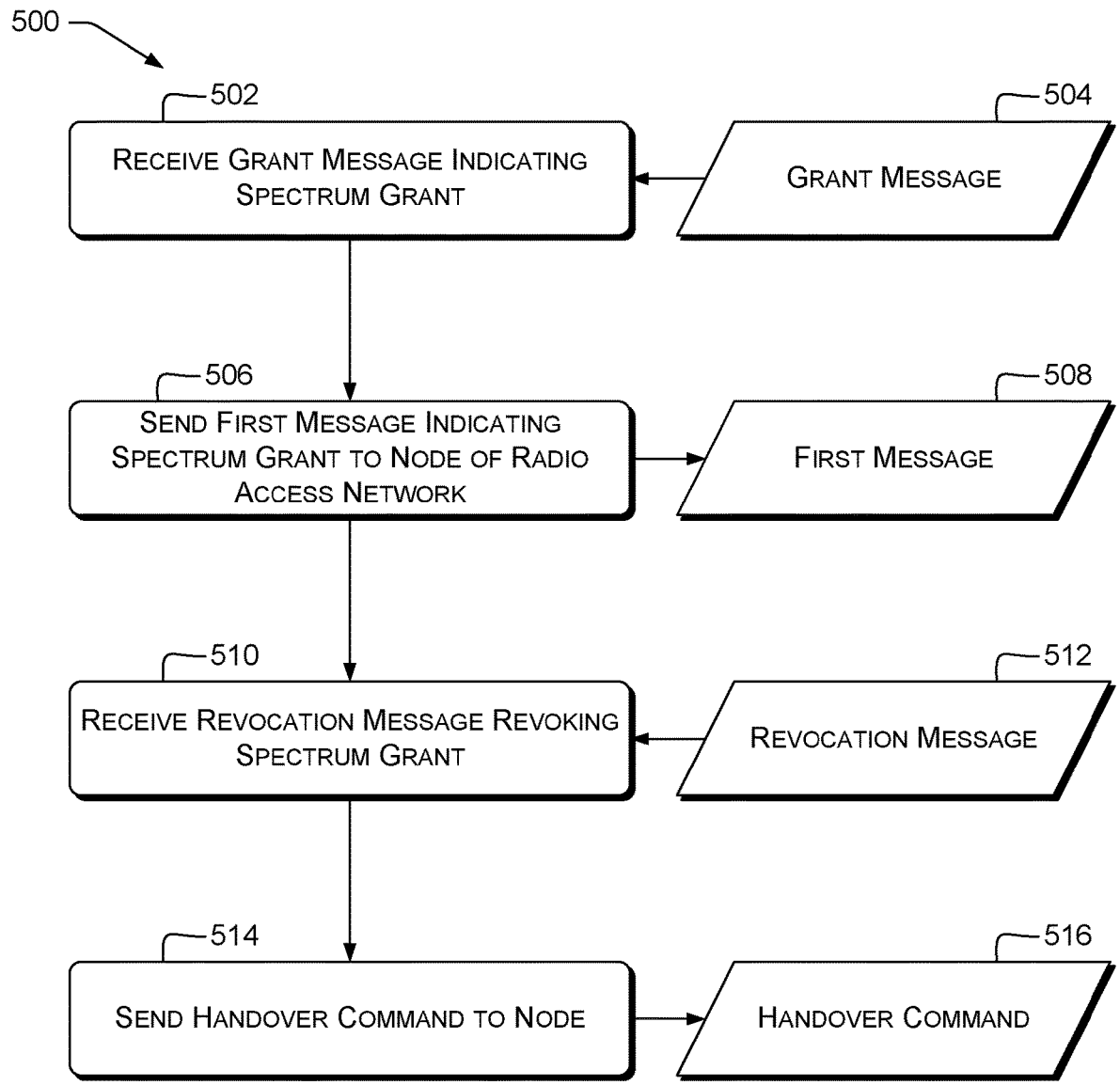
FIG. 5 illustrates an example handover-coordination process performed in a telecommunications network, e.g., at a domain proxy thereof.

FIG. 5 is a dataflow diagram illustrating an example process 500 for managing spectrum grants, and related data items. Process 500 can be performed, e.g., by controller 122, proxy 124, or other server(s) 204 of a telecommunications network 100. In some examples, server(s) 204 include control unit(s) configured to perform operations described below, e.g., in response to computer program instructions of the coordination module 226. In some examples, a system such as that shown in FIG. 1 includes a domain proxy configured to perform operations shown in FIG. 5.

At 502, the control unit can receive a grant message 504 indicating a spectrum grant. Examples are discussed herein, e.g., with reference to operation 402 and grant message 404. For example, the control unit can receive the grant message 504 from a SAS or other controller 122 as defined in TS16.

At 506, the control unit can send a first message 508 (which can represent grant message 404) indicating the spectrum grant to a node of a radio access network, e.g., an entry node 108, 112, or 116. Examples are discussed herein, e.g., with reference to operation 402 and grant message 404. For example, the control unit can aggregate multiple grant messages 504 from controller 122 and provide them as a single array-valued first message 508 to the node.

At 510, the control unit can receive a revocation message 512 revoking the spectrum grant. Examples are discussed herein, e.g., with reference to operation 302 and revocation message 304. Operation 510 can be performed after operation 506.

At 514, the control unit can send a handover (HO) command 516 to the node, e.g., in response to the revocation message 512. For example, the control unit can send the HO command 516 as a JSON object via a TS16-style TLS+ HTTP channel to the node. The HO command 516 can indicate a spectrum grant (e.g., identified by a TS16 grant ID) that should be cleared of terminals 102. Other options for HO command 516 are discussed below.

Figure 6:
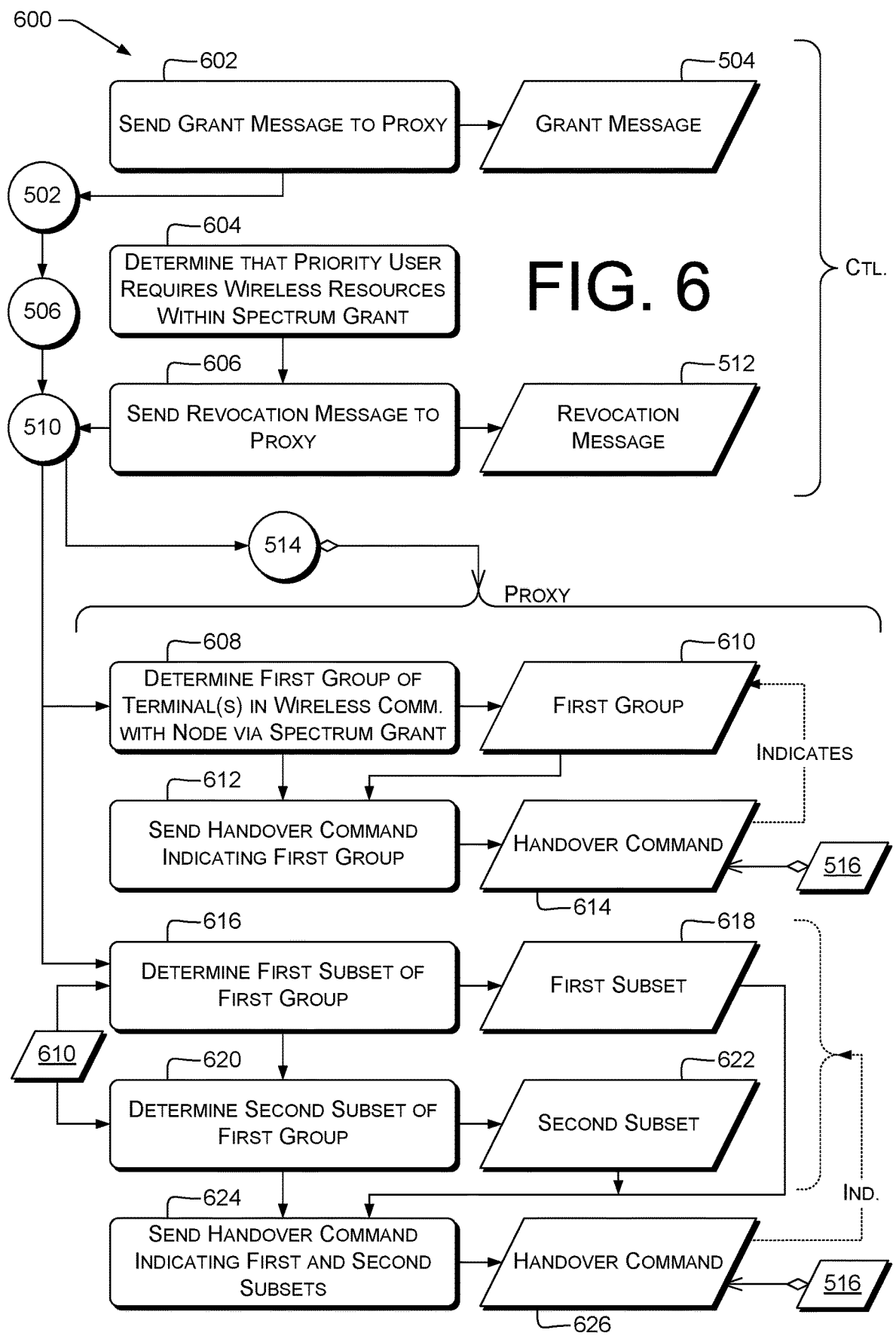
FIG. 6 illustrates example spectrum-management and handover-coordination processes performed in a telecommunications network, e.g., at a controller or a domain proxy thereof.

FIG. 6 is a dataflow diagram illustrating an example process 600 performed by server(s) 204 for managing spectrum grants, and related data items. In some examples, server(s) 204 include control unit(s) configured to perform operations described below, e.g., in response to computer program instructions of the triggering module 224 or the coordination module 226. In some examples, operation 602 can precede operation 502; operations 604 and 606 can precede operation 510; operation 514 can include operations 608-612; or operation 514 can include operations 616-624. In some examples, operation 514 can be followed by operation 608 or operation 616.

For clarity of explanation, FIG. 6 shows operations at a proxy 124 (e.g., a domain proxy) and a controller 122. In some examples, a system includes a controller 122 (e.g., a SAS; shown as "Ctl.") configured to perform at least some of operations 602-606. In some examples, a system includes a domain proxy configured to perform at least some of operations 608-624.

At 602, the control unit of the controller can send the grant message 504 to the proxy, e.g., a domain proxy. Operation 602 can include or be preceded by an operation of determining the grant, e.g., by retrieving information of available spectrum from a database. Additionally or alternatively, operation 602 can include determining that a spectrum grant requested by the node is available, e.g., by querying a database, and sending the grant message in response to this determination. Operation 602 can be followed by operation 502.

At 604, the control unit of the controller can determine that a priority user requires wireless resources within the spectrum grant. Priority users can include, e.g., CBRS incumbent users or Priority Access License (PAL) users. For example, the SAS can receive a message from an Environmental Sensing Capability (ESC) node indicating that a priority user has begun operations within the spectrum grant. The message from the ESC node can indicate which portion(s) of the spectrum grant are in use, e.g., all of a CBRS band or less than all of a CBRS band. Operation 604 can be performed subsequent to operation 602. Operation 604 can precede operations 510 and 606.

At 606, the control unit of the controller can, in response to the determination at operation 604, send the revocation message 512 to the proxy (e.g., domain proxy). For example, the control unit of the controller can determine that the spectrum grant is allocated to a GAA CBRS user or other non-priority user. Examples are discussed herein, e.g., with reference to operation 510. Operation 606 can be followed by operation 510.

In some examples, the message from the ESC node may indicate that not all the band is in use by a priority user. In some of these examples, the control unit of the controller can, after operation 606, send a new grant message to the proxy or an entry node indicating a portion of the band that is not occupied by the priority user.

At 608, the control unit of the proxy can determine a first group 610 of terminals 102 that are in communication with the node via wireless resources within the spectrum grant. Examples are discussed herein, e.g., with reference to operation 306 and first group 308. Group 610 can be determined using any of the criteria described herein with reference to operation 410.

At 612, the control unit of the proxy can send the handover command 614 (which can represent or be included in handover command 516) indicating the first group 610 of terminals 102. For example, the control unit of the proxy can send the handover command 614 as a JSON message via a TLS+HTTP transport, as in TS16. Additionally or alternatively, the control unit of the proxy can send the handover command 614 via another transport, e.g. a SIGTRAN message, or in another format, e.g., XML. In some examples, the handover command 614 can include data indicating the identity or identities of terminals 102 in the first group 610, e.g., hostnames or network addresses of those terminals 102.

At 616, the control unit of the proxy can determine a first subset 618 of the first group 610 of terminals 102. Terminals 102 in the first subset 618 can be participating in active emergency sessions. Examples are discussed herein, e.g., with reference to operation 704, except with processing performed at the control unit of the proxy instead of the control unit of the node. For example, the control unit of the proxy can retrieve identifiers of the terminals 102 to be included in the first subset 618 from a database that is updated by the node as emergency sessions are established and torn down. Additionally or alternatively, the control unit of the proxy can query the node for information about active sessions, and determine which terminals 102 to include in the first subset 618 based on that information (e.g., emergency sessions have an IP address of an E-CSCF indicated in the information).

At 620, the control unit of the proxy can determine a second subset 622 of the first group 610 of terminals 102. Terminals 102 in the second subset can be terminals 102 that are not participating in active emergency sessions. Examples are discussed herein, e.g., with reference to operation 708, except performed at the proxy. Examples of proxy operations are described herein with reference to operation 718. Operations 616 and 620 can be performed in either relative order. As discussed with reference to FIG. 4, any number of subsets can be determined or handed over. Subsets 618, 622 can be determined using any of the criteria described herein with reference to operation 410.

At 624, the control unit of the proxy can send the handover command 626 (which can represent or be included in handover command 516) indicating ("Ind.") the first subset 618 and the second subset 622. In some examples, the handover command 626 can include data indicating the identity or identities of terminals 102 in the first subset 618 and of terminals 102 in the second subset 622, e.g., hostnames or network addresses of those terminals 102.

Figure 7:
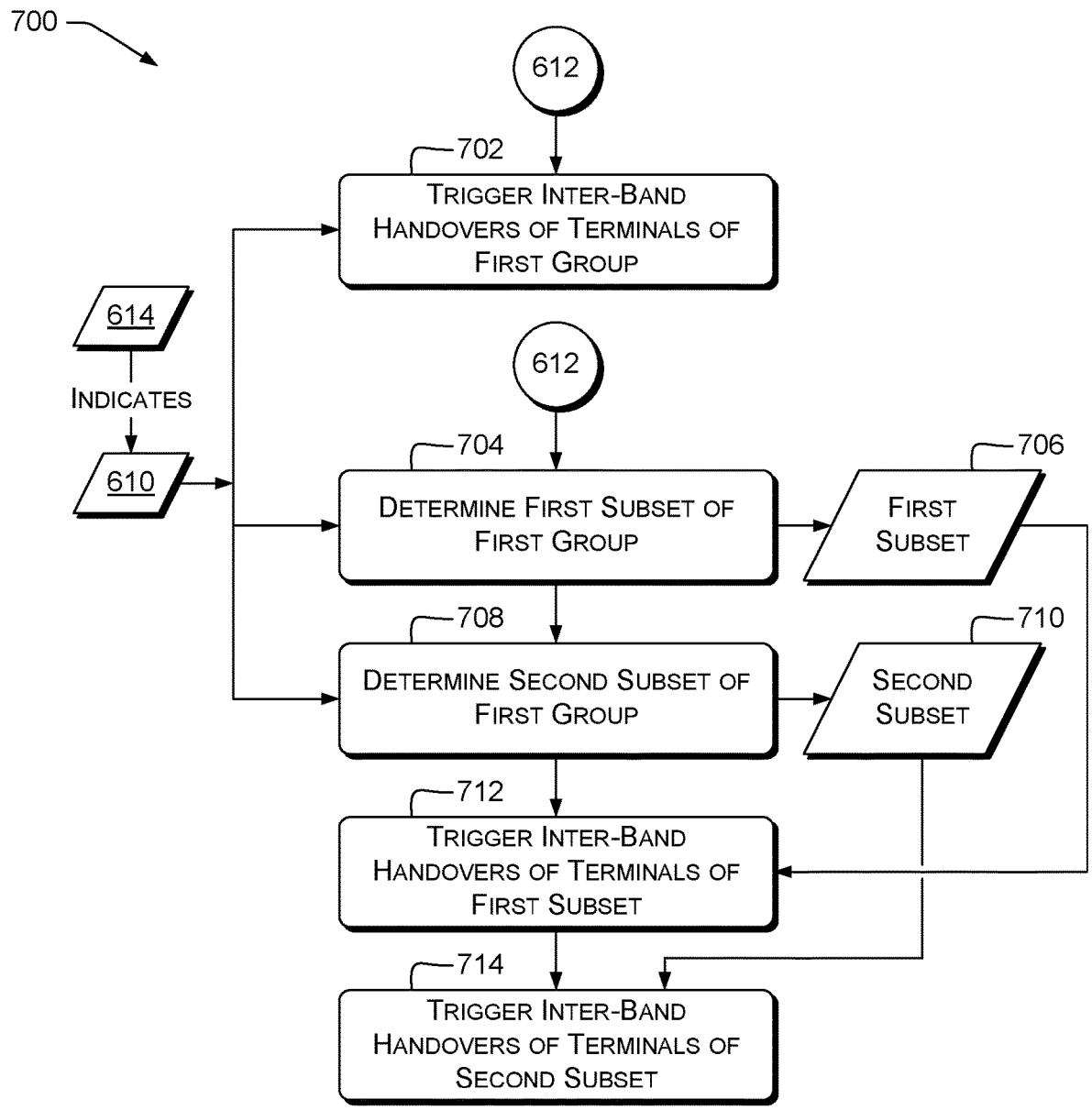
FIG. 7 illustrates example handover-triggering processes performed in a telecommunications network, e.g., at an entry node thereof.
Figure 7:
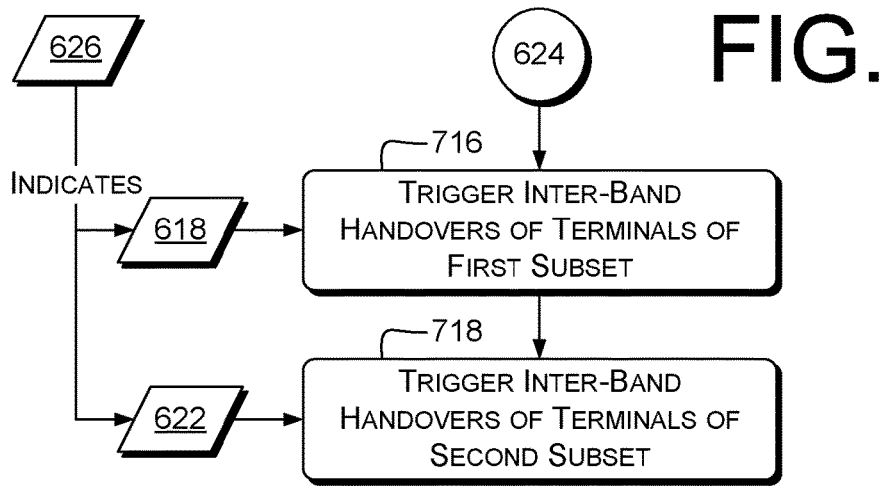

FIG. 7 is a dataflow diagram illustrating an example process 700 performed by server(s) 204 for managing spectrum grants, and related data items. In some examples, server(s) 204 (e.g., of nodes such as entry nodes 108, 112, or 116) include control unit(s) configured to perform operations described below, e.g., in response to computer program instructions of the triggering module 224. In some examples, operation 612 can be followed by operation 702; operation 612 can be followed by operations 704-714; or operation 624 can be followed by operations 716-718.

For clarity of explanation, FIG. 7 shows operations at a node (e.g., an entry node 108, 112, or 116). In some examples, a system includes a node (e.g., entry node 108, 112, or 116) configured to perform operations 702-718.

At 702, the control unit of the node can trigger respective inter-band handovers of the terminals 102 of the first group 610 of terminals 102 indicated in the handover command 614.

At 704, the control unit of the node can determine a first subset 706 of the first group 610 of terminals 102 indicated in the handover message 614. Terminals 102 in the first subset 706 can be participating in active emergency sessions. Examples are discussed herein, e.g., with reference to operation 410 and first subset 412.

At 708, the control unit of the node can determine a second subset 710 of the first group 610 of terminals 102. Terminals 102 in the second subset 710 can be terminals 102 that are not participating in active emergency sessions. Examples are discussed herein, e.g., with reference to operation 414 and second subset 416. Operations 704 and 708 can be performed in either relative order. As discussed with reference to FIG. 4, any number of subsets can be determined or handed over. Subsets 706, 710 can be determined using any of the criteria described herein with reference to operation 410.

At 712, the control unit of the node can trigger the respective inter-band handovers of the terminals 102 of the first subset 706. Examples are discussed herein, e.g., with reference to operation 418.

At 714, the control unit of the node can, subsequently, trigger the respective inter-band handovers of the terminals 102 of the second subset 710. Examples are discussed herein, e.g., with reference to operation 420.

At 716, the control unit of the node can trigger the respective inter-band handovers of the terminals 102 of the first subset 618 indicated in the handover command 626. Examples are discussed herein, e.g., with reference to operation 704.

At 718, the control unit of the node can, subsequently, trigger the respective inter-band handovers of the terminals 102 of the second subset 622 indicated in the handover command 626. Examples are discussed herein, e.g., with reference to operation 714.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A method, comprising, by a node of a radio access network: receiving a revocation message revoking a spectrum grant; determining a first group of terminals that are in communication with the node via wireless resources within the spectrum grant; and in response to the revocation message, triggering respective inter-band handovers of the terminals of the first group of terminals.

B: The method according to paragraph A, wherein the revocation message comprises a Citizens Broadband Radio Service (CBRS) discontinuation notice.

C: The method according to paragraph A or B, further comprising triggering the inter-band handovers within a predetermined time period associated with the revocation message.

D: The method according to any of paragraphs A-C, further comprising: determining a first subset of the first group of terminals, wherein terminals in the first subset are participating in active emergency sessions; determining a second subset of the first group of terminals, wherein terminals in the second subset are not participating in active emergency sessions; triggering the respective inter-band handovers of the terminals of the first subset; and subsequently, triggering the respective inter-band handovers of the terminals of the second subset.

E: The method according to paragraph D, wherein the first subset comprises every terminal of the first group that is participating in an active emergency session.

F: The method according to any of paragraphs A-E, wherein the first group comprises every terminal in communication with the node via wireless resources within the spectrum grant.

G: The method according to any of paragraphs A-F, wherein the spectrum grant is located within Third-Generation Partnership Project band forty-eight.

H: The method according to any of paragraphs A-G, further comprising, before receiving the revocation message: receiving a grant message indicating the spectrum grant; and broadcasting a wireless-communication synchronization signal within the spectrum grant.

I: The method according to any of paragraphs A-H, further comprising triggering the handover of a first terminal of the first group by transmitting a Radio Resource Control (RRC) message to the first terminal.

J: At least one tangible, non-transitory computer-readable medium comprising instructions that, when executed by at least one processor, cause the at least one processor to perform operations comprising: receiving, via a communications interface, a revocation message revoking a spectrum grant; determining a first group of terminals that are in communication with the node via wireless resources within the spectrum grant; and in response to the revocation message, triggering respective inter-band handovers of the terminals of the first group of terminals.

K: The at least one tangible, non-transitory computer-readable medium according to paragraph J, wherein: the revocation message comprises a Citizens Broadband Radio Service (CBRS) discontinuation notice; and the operations further comprise triggering the inter-band handovers within a predetermined time period associated with the revocation message.

L: The at least one tangible, non-transitory computer-readable medium according to paragraph J or K, the operations further comprising triggering the handover of a first terminal of the first group by transmitting a Radio Resource Control (RRC) message to the first terminal.

M: The at least one tangible, non-transitory computer-readable medium according to any of paragraphs J-L, the operations further comprising: determining a first subset of the first group of terminals based at least in part on at least one stored predetermined criterion; determining a second subset of the first group of terminals, wherein each terminal in the second subset is not in the first subset; triggering the respective inter-band handovers of the terminals of the first subset; and subsequently, triggering the respective inter-band handovers of the terminals of the second subset.

N: The at least one tangible, non-transitory computer-readable medium according to paragraph M, wherein the first subset comprises every terminal of the first group that is participating in an active emergency session.

O: The at least one tangible, non-transitory computer-readable medium according to paragraph M or N, the operations further assigning a first terminal of the first group of terminals to the first subset based at least in part on at least one of: a signal strength or a signal quality of a signal received at the first terminal; a signal strength or a signal quality of a signal received from the first terminal; a wireless-network capacity; or a type of a session in which the first terminal is participating.

P: A system comprising: a domain proxy configured to perform first operations comprising: receiving a grant message indicating a spectrum grant; sending a first message indicating the spectrum grant to a node of a radio access network; subsequently, receiving a revocation message revoking the spectrum grant; and sending a handover command to the node in response to the revocation message.

Q: The system according to paragraph P, wherein: the first operations comprise: determining a first group of terminals that are in communication with the node via wireless resources within the spectrum grant; and sending the handover command indicating the first group of terminals; and the system further comprises the node configured to perform second operations comprising: receiving the handover command; and triggering respective inter-band handovers of the terminals of the first group of terminals indicated in the handover command.

R: The method according to paragraph Q, the second operations comprising: determining a first subset of the first group of terminals, wherein terminals in the first subset are participating in active emergency sessions; determining a second subset of the first group of terminals, wherein terminals in the second subset are not participating in active emergency sessions; triggering the respective inter-band handovers of the terminals of the first subset; and subsequently, triggering the respective inter-band handovers of the terminals of the second subset.

S: The method according to paragraph Q or R, wherein: the first operations comprise: determining a first subset of the first group of terminals, wherein terminals in the first subset are participating in active emergency sessions; determining a second subset of the first group of terminals, wherein terminals in the second subset are not participating in active emergency sessions; and sending the handover command indicating the first subset and the second subset; and the second operations comprise: triggering the respective inter-band handovers of the terminals of the first subset indicated in the handover command; and subsequently, triggering the respective inter-band handovers of the terminals of the second subset indicated in the handover command.

T: The system according to any of paragraphs P-S, further comprising a controller configured to perform third operations comprising: sending the grant message to the domain proxy; subsequently, determining that a priority user requires wireless resources within the spectrum grant; and in response, sending the revocation message to the domain proxy.

U: A method, comprising, by a node of a radio access network: receiving a CBRS discontinuation notice; and in response, triggering inter-band handovers of all terminals attached to the node.

V: The method according to paragraph U, the triggering comprising: triggering the inter-band handovers of terminals with active emergency sessions; and subsequently, triggering the inter-band handovers of terminals without active emergency sessions.

W: The method according to any of paragraphs A-I, J-O, Q-S, or U, wherein the inter-band handovers are handovers from an unlicensed band to a licensed band or a licensed+unlicensed band (e.g., LAA).

X: The method according to paragraph W, wherein the unlicensed band is a CBRS band.

Y: A computer-readable medium, e.g., a computer storage medium, having thereon computer-executable instructions, the computer-executable instructions upon execution configuring a computer to perform operations as any of paragraphs A-I, J-O, P-T, or U-X recites.

Z: A device comprising: a processor; and a computer-readable medium, e.g., a computer storage medium, having thereon computer-executable instructions, the computer-executable instructions upon execution by the processor configuring the device to perform operations as any of paragraphs A-I, J-O, P-T, or U-X recites.

AA: A system comprising: means for processing; and means for storing having thereon computer-executable instructions, the computer-executable instructions including means to configure the system to carry out a method as any of paragraphs A-I, J-O, P-T, or U-X recites.

AB: A telecommunication system comprising components recited in any of paragraphs A-I, J-O, P-T, or U-X.

AC: A telecommunication device configured to perform operations as recited in any of paragraphs A-I, J-O, P-T, or U-X.

CONCLUSION

Many variations and modifications can be made to the above-described examples, the elements of which are to be understood as being among other acceptable examples. All such modifications and variations are intended to be included herein within the scope of this disclosure and protected by the claims. Moreover, this disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

The methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem.

Example computer-implemented operations described herein can additionally or alternatively be embodied in specialized computer hardware, e.g., FPGAs. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A method, comprising, by a node of a radio access network:
   receiving a revocation message revoking a spectrum grant;
   determining a group of terminals that are in communication with the node via wireless resources within the spectrum grant;
   determining a first subset of the group of terminals, wherein terminals in the first subset are participating in active emergency sessions;
   determining a second subset of the group of terminals, wherein terminals in the second subset are not participating in active emergency sessions; and
   in response to the revocation message, triggering respective inter-band handovers of the terminals of the group of terminals, wherein the triggering includes:
      triggering the respective inter-band handovers of the terminals of the first subset; and
      subsequently, triggering the respective inter-band handovers of the terminals of the second subset.

2. The method according to claim 1, wherein the revocation message comprises a Citizens Broadband Radio Service (CBRS) discontinuation notice.

3. The method according to claim 1, further comprising triggering the inter-band handovers within a predetermined time period associated with the revocation message.

4. The method according to claim 1, wherein the first subset comprises every terminal of the group of terminals that is participating in an active emergency session.

5. The method according to claim 1, wherein the group of terminals comprises every terminal in communication with the node via wireless resources within the spectrum grant.

6. The method according to claim 1, wherein the spectrum grant is located within Third Generation Partnership Project (3GPP) band forty-eight.

7. The method according to claim 1, further comprising, before receiving the revocation message:
   receiving a grant message indicating the spectrum grant; and
   broadcasting a wireless-communication synchronization signal within the spectrum grant.

8. The method according to claim 1, further comprising triggering the handover of a terminal of the group of terminals by transmitting a Radio Resource Control (RRC) message to the terminal.

9. At least one tangible, non-transitory computer-readable medium comprising instructions that, when executed by at least one processor, cause the at least one processor to perform operations comprising:
   receiving, via a communications interface, a revocation message revoking a spectrum grant;
   determining a group of terminals that are in communication with the node via wireless resources within the spectrum grant;
   determining a first subset of the group of terminals based at least in part on at least one stored predetermined criterion;
   determining a second subset of the group of terminals, wherein each terminal in the second subset is not in the first subset; and
   in response to the revocation message, triggering respective inter-band handovers of the terminals of the group of terminals, wherein the triggering includes:
      triggering the respective inter-band handovers of the terminals of the first subset; and
      subsequently, triggering the respective inter-band handovers of the terminals of the second subset.

10. The at least one tangible, non-transitory computer-readable medium according to claim 9, wherein:
   the revocation message comprises a Citizens Broadband Radio Service (CBRS) discontinuation notice; and
   the operations further comprise triggering the inter-band handovers within a predetermined time period associated with the revocation message.

11. The at least one tangible, non-transitory computer-readable medium according to claim 9, the operations further comprising triggering the handover of a terminal of the group of terminals by transmitting a Radio Resource Control (RRC) message to the terminal.

12. The at least one tangible, non-transitory computer-readable medium according to claim 9, wherein the first subset comprises every terminal of the group of terminals that is participating in an active emergency session.

13. The at least one tangible, non-transitory computer-readable medium according to claim 9, the operations further assigning a terminal of the group of terminals to the first subset based at least in part on at least one of:
   a signal strength or a signal quality of a signal received at the terminal;
   a signal strength or a signal quality of a signal received from the terminal;
   a wireless-network capacity; or
   a type of a session in which the terminal is participating.

14. A system comprising:
   a domain proxy configured to perform first operations comprising:
      receiving a grant message indicating a spectrum grant;
      sending a first message indicating the spectrum grant to a node of a radio access network;
      subsequently, receiving a revocation message revoking the spectrum grant;
      determining a group of terminals that are in communication with the node via wireless resources within the spectrum grant;
      determining a first subset of the group of terminals, wherein terminals in the first subset are participating in active emergency sessions;
      determining a second subset of the group of terminals, wherein terminals in the second subset are not participating in active emergency sessions; and
      sending a handover command to the node in response to the revocation message, wherein the handover command indicates the group of terminals, the first subset, and the second subset; and
   the node configured to perform second operations comprising:
      receiving the handover command; and
      triggering respective inter-band handovers of the terminals of the group of terminals indicated in the handover command, wherein the triggering includes:
         triggering the respective inter-band handovers of the terminals of the first subset indicated in the handover command; and
         subsequently, triggering the respective inter-band handovers of the terminals of the second subset indicated in the handover command.

15. The system according to claim 14, further comprising a controller configured to perform third operations comprising:
- sending the grant message to the domain proxy;
- subsequently, determining that a priority user requires wireless resources within the spectrum grant; and
- in response, sending the revocation message to the domain proxy.

16. The at least one tangible, non-transitory computer-readable medium according to claim 9, the operations further comprising, before receiving the revocation message:
- receiving a grant message indicating the spectrum grant; and
- broadcasting a wireless-communication synchronization signal within the spectrum grant.

17. The system according to claim 14, wherein the revocation message comprises a Citizens Broadband Radio Service (CBRS) discontinuation notice.

18. The system according to claim 14, wherein the second operations further comprise triggering the inter-band handovers within a predetermined time period associated with the revocation message.

19. The system according to claim 14, wherein the second operations further comprise, before receiving the revocation message:
- receiving a grant message indicating the spectrum grant; and
- broadcasting a wireless-communication synchronization signal within the spectrum grant.

20. The system according to claim 14, wherein the second operations further comprise triggering the handover of a terminal of the group of terminals by transmitting a Radio Resource Control (RRC) message to the terminal.

* * * * *